Patented Sept. 8, 1953

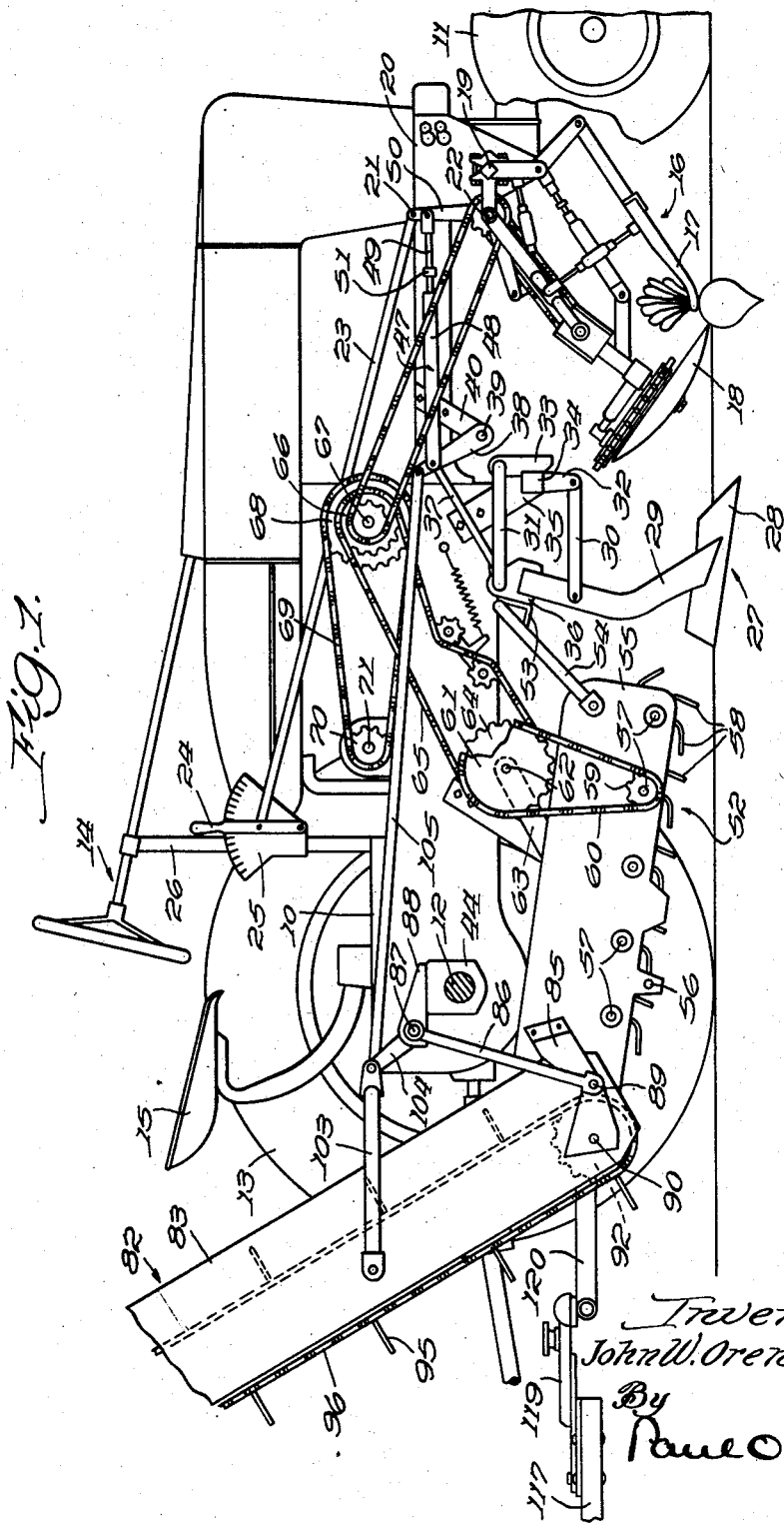

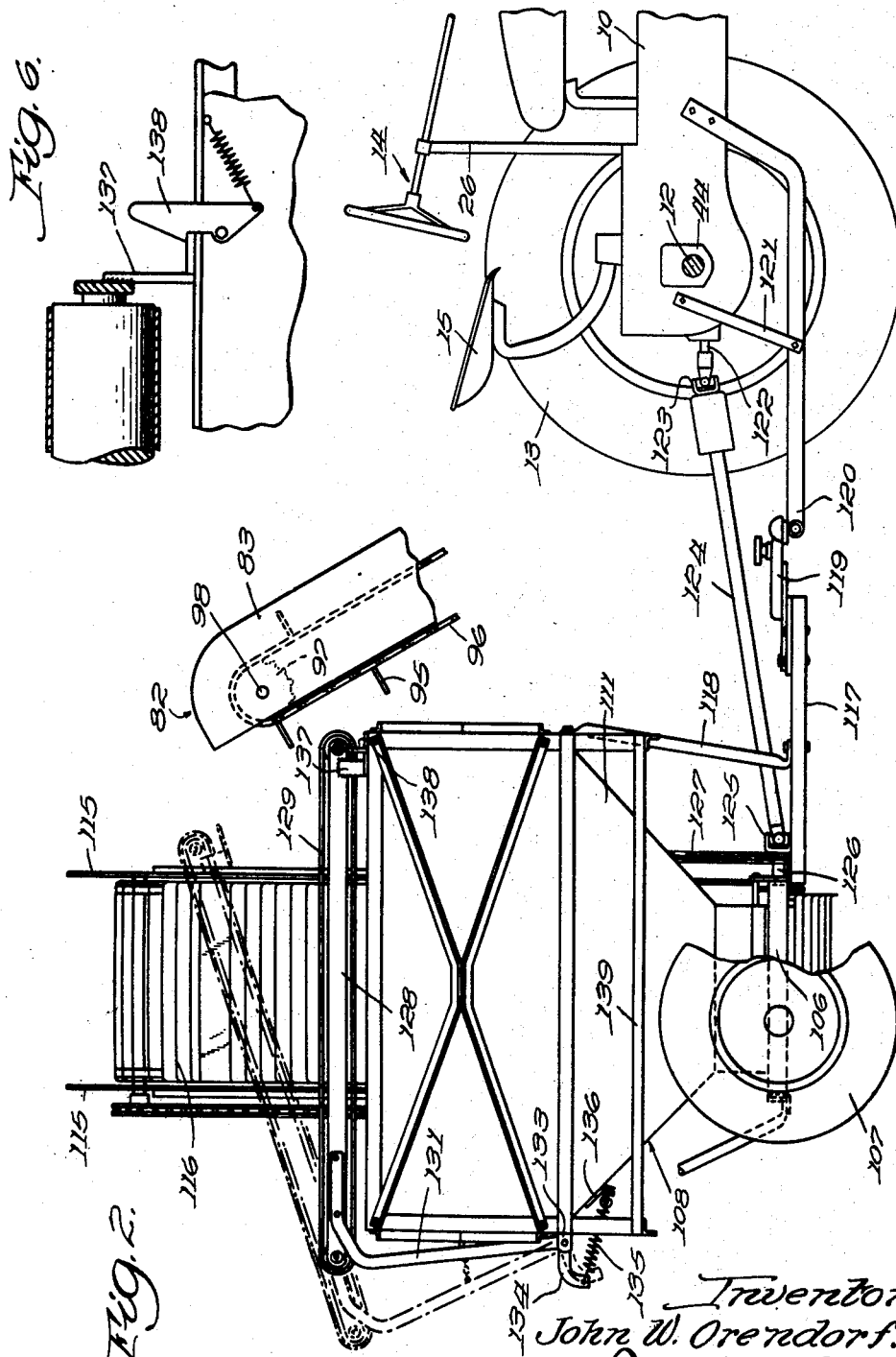

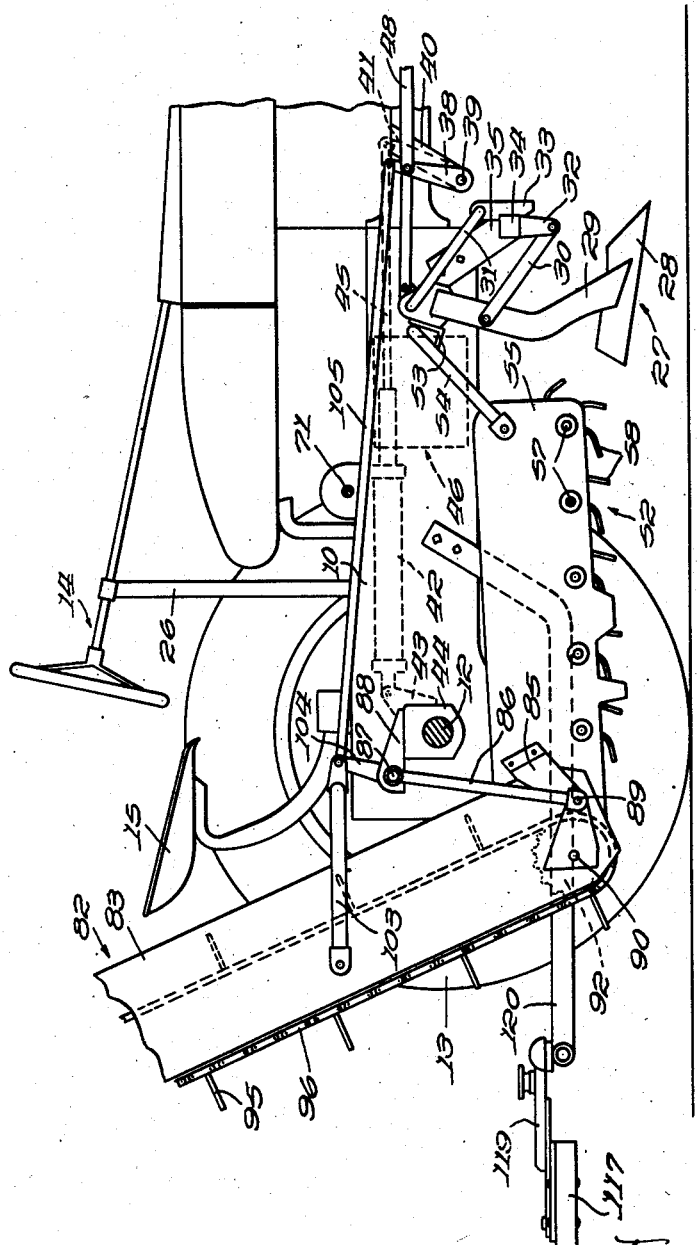

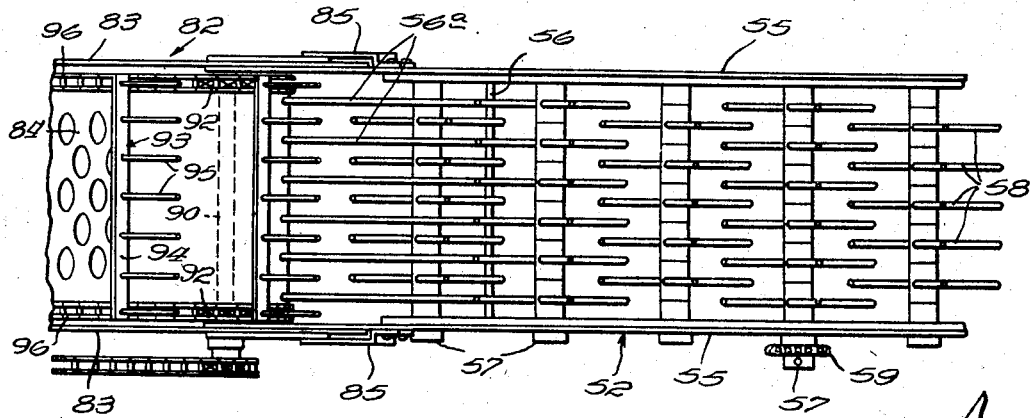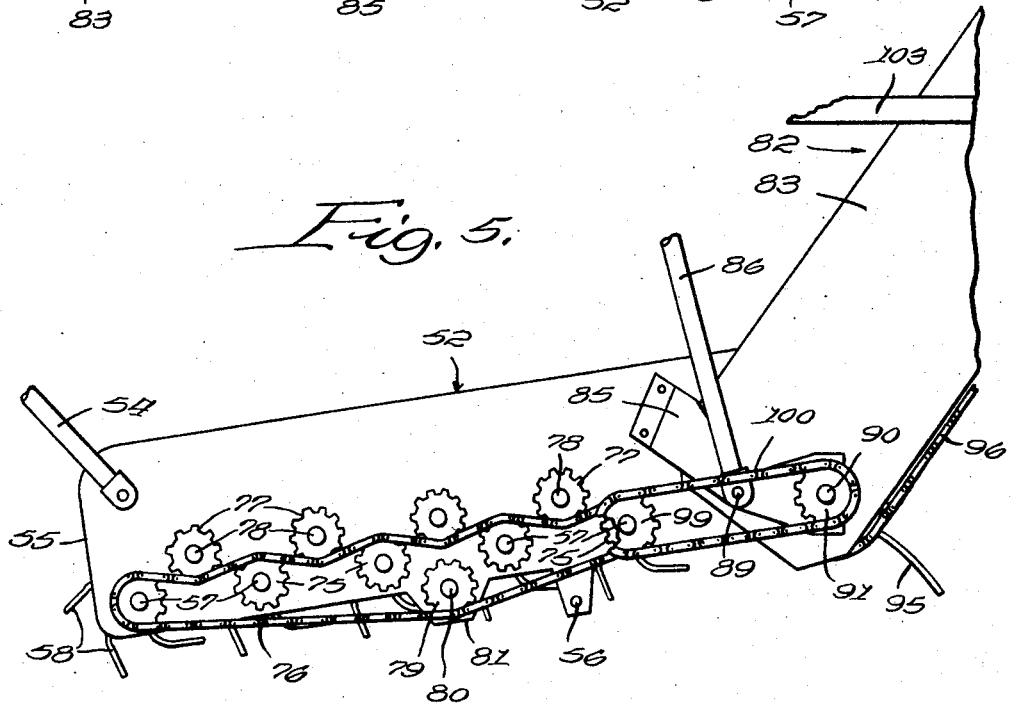

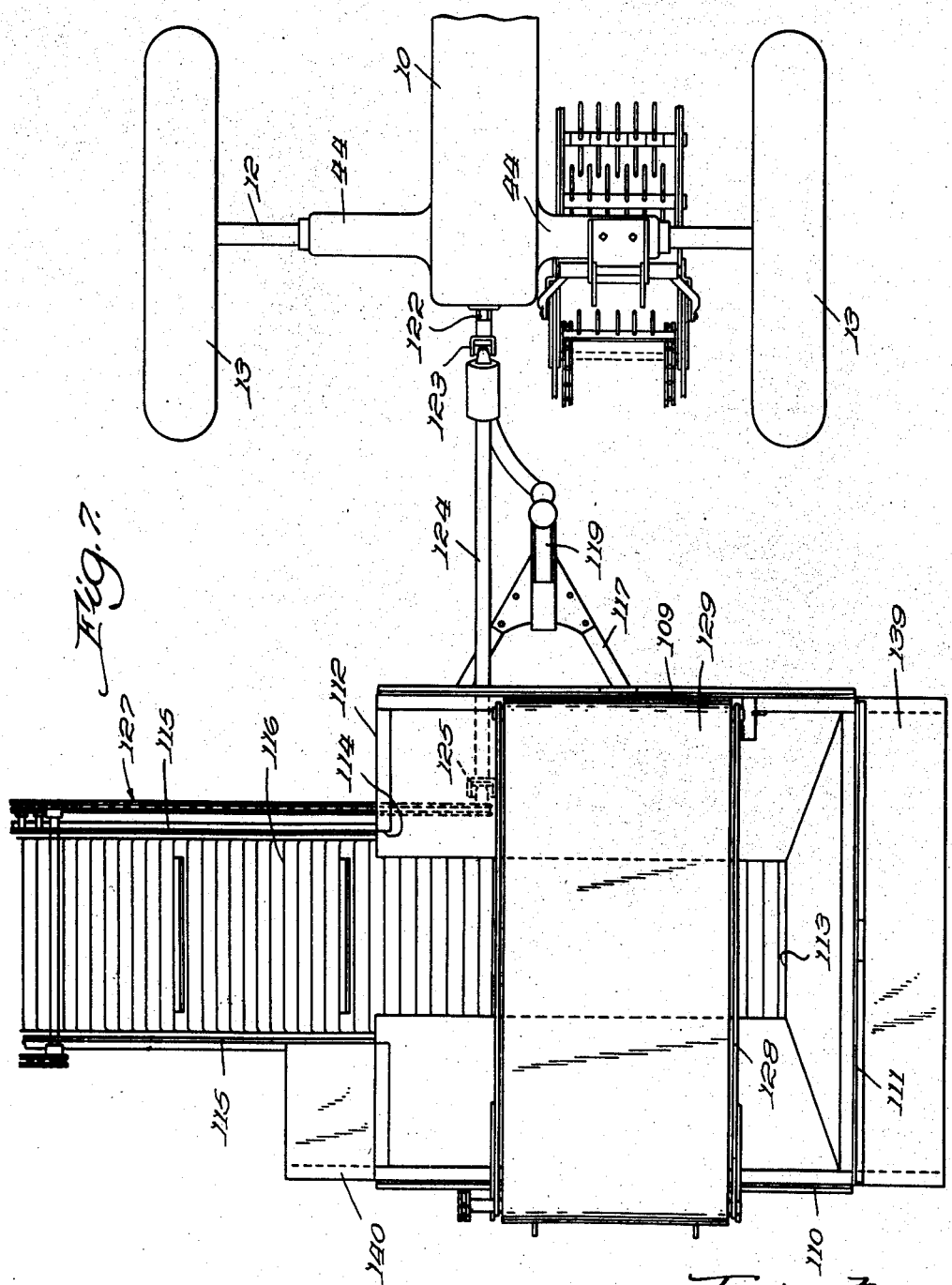

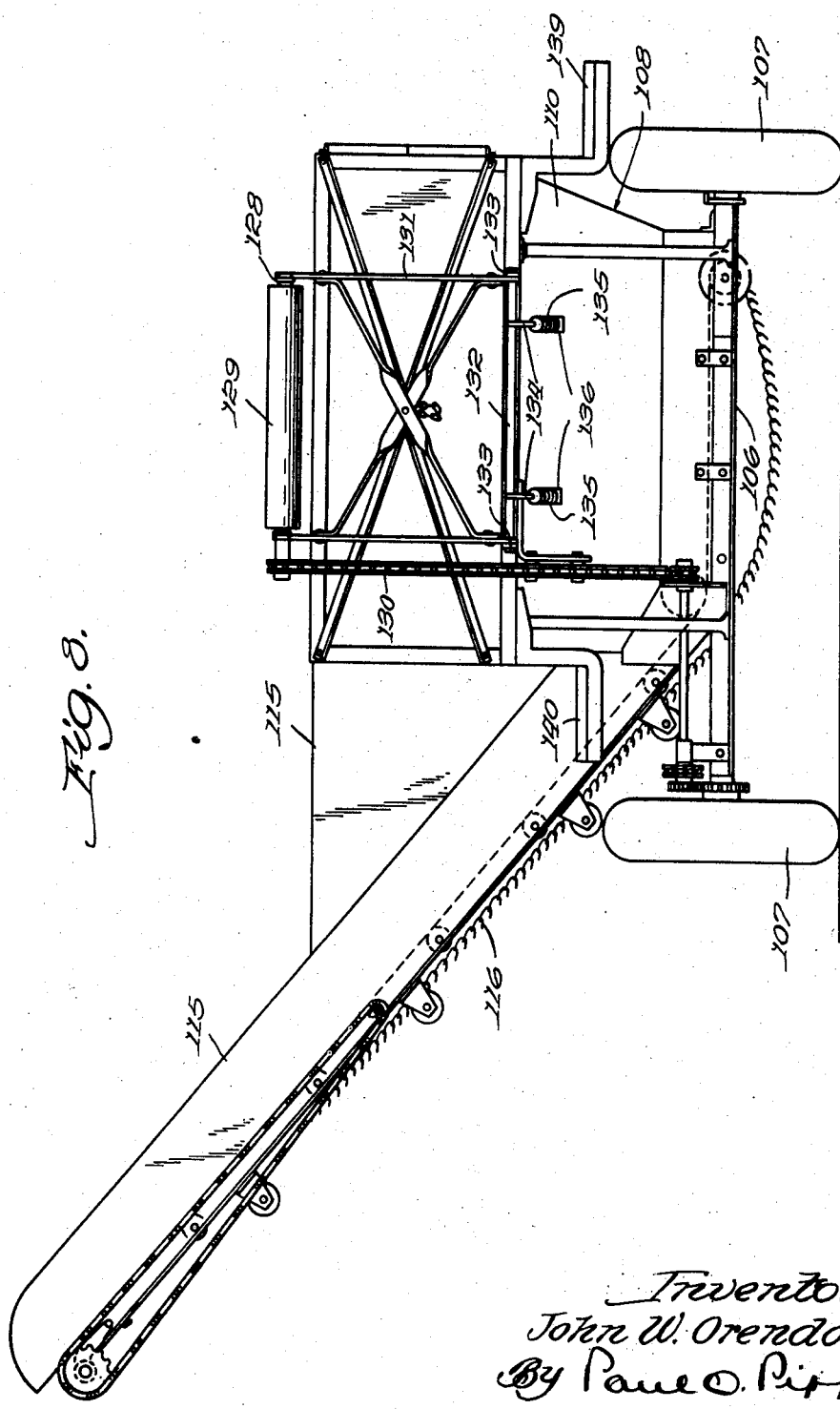

2,651,155

UNITED STATES PATENT OFFICE 2,651,155

POWER-OPERATED BEET HARVESTING DEVICE

John W. Orendorff, Canton, Ill., assignor to International Harvester Company, a corporation of New Jersey Application August 17, 1946, Serial No. 691,188

5 Claims. (Cl. 55—51)

This invention relates to agricultural implements, and particularly to harvesters for root crops such as beets and the like.

A beet harvesting machine incorporating many of the elements of the machine of the present invention is shown and described in United States Patent No. 2,458,795, which includes a rotary knife for severing the tops of the beets projecting above the ground; digging blades for loosening and removing the beets from beneath the surface of the ground, a cleaning mechanism for loosening dirt adhering to the beets, and an elevating conveyor arranged rearwardly of the digger and cleaner or shaker to receive the beets and elevate them to a position for discharge into a receptacle.

Prior to the advent of machinery for the harvesting of sugar beets, the digging thereof and loading into vehicles for transportation were performed largely by hand, and in many areas manual harvesting is still largely practiced. This is due in large part to the failure of machinery so far developed to satisfactorily perform the harvesting functions. For example, the failure of machines to properly remove the tops from beets of varying size has induced many growers to resort to hand topping. This is, of course, slow and costly. After the beets are dug they are usually left upon the ground and later removed by gathering machinery. The simultaneous gathering of large quantities of soil and removal thereof with consequent depletion of the land is one of the evils attendant upon this method of operation and the avoidance of which is one of the objects of this invention. Being a root crop, dirt and debris cling to the beets, and this is particularly so if the ground is wet.

The result is, that, by the methods and apparatus previously employed, a large amount of dirt and debris not only is removed from the field but finds its way into each load delivered to the processing plants. The higher the percentage of dirt in the load the lower is the net return to the grower so that he not only loses the soil from his farm but he also suffers a loss in the reduced value of his beets per load. The provision of a method and means for harvesting beets with a minimum inclusion therewith of dirt and debris is therefore an important object of the present invention.

Another object of the invention is the provision of harvesting machinery powered from a single source including mechanism for removing the tops from the beets, digging the beets and conveying them to a receptacle where the dirt and debris are separated therefrom and discharged upon the ground.

Another object of the invention is to provide improved machinery for harvesting beets and the like including mechanism for removing dirt and debris from the beets prior to their delivery to a receptacle.

A further object of the invention is to provide an improved tractor-mounted beet harvester.

Other objects and advantages will become clear from the following detailed description when read in conjunction with the accompanying drawings, wherein:

Figure 1 is a view in side elevation of a tractor with one rear wheel removed, showing a beet harvester embodying the features of the present invention attached thereto;

Figure 2 is a continuation of Figure 1 with parts removed for clarity, and shows the upper end of the elevator and its relationship to the cart attached to the rear end of the tractor to receive harvested vegetables;

Figure 3 is a view in side elevation similar to Figure 1, showing only the rear portion of the tractor with the implement parts in raised position;

Figure 4 is a plan view of the combination cleaner and conveyor which delivers the beets to the elevator;

Figure 5 is a side elevation of the cleaner showing the driving mechanism therefor and its connection to the elevator;

Figure 6 is an enlarged detail partly in section showing the latching mechanism for releasably holding the sorting conveyor in operating position on the cart or receptacle;

Figure 7 is a plan view of the structure shown in Figure 2; and

Figure 8 is a rear elevation of the cart.

Referring to the drawings, numeral 10 designates the longitudinally extending body of a tractor having front wheels 11, a transverse rear axle 12, and rear wheels 13. The front wheels 11 are steerable from a steering mechanism indicated at 14 accessible to the operator's station 15.

Prior to separation of the beets from the soil and gathering them in the cart attached to the rear end of the tractor, the beets are topped; that is, the foliage growing from the top of the beet is severed and removed. This is accomplished by a mechanism shown attached to the front end of the tractor generally indicated by the numeral 16 and including a feeler gauge 17 and a revolving disk 18. For the details of construction of the beet topper, reference may be had to United States Patent No. 2,458,795. The topping mechanism is supported upon a transverse tool bar 19 affixed to a plate 20 secured to the side of the tractor. The gauge 17 is adjusted with respect to the cutter disk by a mechanism including an arm 21 mounted upon a transverse shaft 22. A rod 23 connected to arm 21 has its other end connected to a lever 24 pivoted upon a quadrant 25 mounted upon the steering gear standard 26.

After the tops have been removed from the beets, the beets are separated from the ground by a digging mechanism generally indicated at 27. The digger includes digging blades 28 carried by standards 29 supported at the rear ends of a pair of vertically spaced parallel links 30 and 31. The forward ends of the links are pivotally connected respectively to brackets 32 and 33 affixed to a transverse tool bar 34 supported by a bracket 35 mounted upon the side of the tractor. The upper parallel link 31 has its rear end pivotally mounted in a bearing 36 to which is attached a link 37, the other end of which is connected to an arm 38 secured to a transverse shaft 39. Shaft 39 is supported by one or more brackets 40 attached to the side of the tractor. Shaft 39 extends transversely of the tractor and to the other side thereof, and is provided at its other end with an arm 41 indicated in dotted lines in Figure 3.

Referring particularly to Figure 3, it will be noted that shaft 39 and, therefore, arms 38 and 41 mounted thereon are rocked in a generally forward and rearward direction by a power lift mechanism including a hydraulic cylinder 42 anchored at one end upon a bracket 43 secured to the housing 44 for the rear axle 12. Housings 44 extend laterally from the tractor body in the manner indicated in Figure 7. Cylinder 42 has a piston rod 45 connected to the arm 41 to effect forward and rearward rocking movement thereof. The cylinder 42 is preferably a double-acting hydraulic cylinder receiving fluid under pressure from an oil pump indicated at 46, deriving power in a manner not shown for the operation thereof from the tractor power plant.

In Figure 1 it will also be observed that a link in the form of a telescoping member 47 includes a sleeve 48 attached to the arm 38 and a shaft 49 attached to an arm 50 affixed to the transverse shaft 22. Shaft 49 is also provided with a collar 51 for abutment against the end of sleeve 48. Rocking of shaft 22, by movement of arm 50, causes the topping mechanism to move vertically to and from operating position. This is accomplished by the hydraulic cylinder shown in Figure 3 operating through arms 41 and 38 and transmitting motion through member 47 to arm 50 secured to the shaft 22. It will also be noted that through the connection of link 37 with arm 38 the digging mechanism 27 will likewise be moved vertically to and from operating position substantially simultaneously with movement of the topping mechanism. However, due to the telescoping of link member 47 and the position of collar 51 the topping mechanism 16 is permitted a limited amount of free floating movement.

Upon separation of the beets from the soil by the digging mechanism 27, they are carried upwardly due to the disposition and angle of penetration of the blades 28 and are received by a cleaner or agitator mechanism generally indicated at 52. In order to support the cleaner 52 for movement to and from operating position, a bracket 53 is provided on the rear of bearing 36, and secured to bracket 53 are arms 54, shown in Figures 3 and 5, the lower ends of which are pivotally connected to the forward ends of a pair of laterally spaced, longitudinally extending plates 55 clearly shown in Figure 4. A spacer bar 56 is provided between the plates at the lower portion thereof, and the plates are further spaced by transverse shafts 57, a number of which are situated at longitudinally spaced points in the lower portion of plates 55, as clearly shown in the drawings. Between the plates 55, the shafts 57 are provided with circumferentially spaced radially extending fingers 58, the fingers on adjacent shafts being interlaced to prevent contact therebetween and to provide support for beets carried thereover. Fingers 56a are provided on bar 56 which extend rearwardly beyond the rearmost shaft 57 and prevent beets falling through between the cleaner and the elevator. By driving the shafts 57 and thus causing the fingers 58 to rotate in a counter-clockwise direction as viewed in Figure 1, the beets are carried rearwardly to an elevator hereinafter to be described. The shafts 57 are driven by a mechanism including a sprocket wheel 59, drivingly connected by a chain 60 to a sprocket 61 mounted upon a transverse shaft 62, rotatably mounted in the upwardly projecting end of bracket 63 affixed to one of the plates 55. Another sprocket 64 mounted on shaft 62 is driven by a chain 65 trained around a sprocket 66 carried by a shaft 67 mounted upon the side of the tractor. Shaft 67 also carries a larger sprocket 68 which is drivingly connected by a chain 69 to a smaller sprocket 70 carried by a power take-off shaft 71, driven by the tractor power plant. Drive is thus transmitted from sprocket 71 through shafts 67 and 62 to sprocket 59 mounted upon one of the shafts 57.

On the inner ends of each of the shafts 57 there are keyed sprockets 75 (see Fig. 5) having trained therearound an endless chain 76. The upper course of chain 76 is maintained in engagement with the upper portion of sprockets 75 by idler sprockets 77 on shafts 78 mounted upon the inner plate 55, one of the sprockets 77 being placed between each pair of sprockets 75. The lower course of chain 76 is held out of contact with the sprockets intermediate the end sprockets by another sprocket wheel 79 on a stub shaft 80 rotatably mounted in an extension 81 projecting downwardly from left-hand plate 55. Drive is thus transmitted from sprocket 59 to sprockets 75 to rotate the shafts 57 in a counter-clockwise direction, as viewed in Figure 1. The beets dug by the blades 28 and received by the agitator 52 are thus carried rearwardly by the fingers 58, and it should be clear that the action of fingers 58 is such that the beets will be bounced up and down or shaken as they are conveyed rearwardly, so that dirt adhering thereto is loosened and clods are broken up. Agitator 52 thus functions as a combined shaker and conveyor.

The beets conveyed rearwardly by the shaker 52 are received by an elevator generally indicated at 82. Conveyor 82 includes laterally spaced side walls 83, and a foraminated bottom 84 through which foreign material may be passed as the beets are advanced by the elevator. Elevator 82 is secured to the sides 55 of the shaker 52 by laterally spaced straps 85 secured to the outside of the side walls 83 and to the laterally spaced side plates 55. The elevator 82 extends upwardly and rearwardly, and the lower end thereof and the rear end of the agitator are suspended from the housing 44 between the tractor body and the right hand drive wheel and supported by laterally spaced links 86, pivoted upon a transverse shaft 87 mounted in a bracket 88 affixed to the rear axle housing 44. These links 86 on opposite sides of the elevator extend downwardly, and the lower ends thereof are pivotally connected at 89 to straps 85 forming a cradle in which the elevator is supported. While the connection of straps 85 to the plates 55 on agitator 52 is rigid, the connection thereof to the side walls 83 of the conveyor 82 is a pivotal one, the straps being mounted upon a transverse shaft 90 extending through the lower portion of the side walls 83 of the conveyor. The shaft 90 is provided with a sprocket 91 and spaced sprockets 92 which serve to drive the elevating mechanism 93, clearly shown in Figure 4, and including spaced transverse members 94 to which are secured outwardly projecting fingers 95. The ends of members 94 are carried upon laterally spaced endless chains 96 trained around sprockets 92 keyed to the shaft 90 between the walls 83. The upper ends of the chains 96 are trained around sprockets 97 mounted upon a transverse shaft 98 between plates 83 at their upper ends as shown in Figure 2. In order to transmit drive to the elevator mechanism, an addtional sprocket 99 is provided on the inner end of the shaft 57 at the rear of agitator 52. This sprocket is drivingly connected by a chain 100 to the sprocket 91 on the inner end of shaft 90.

The lower portion of the elevator 82 is supported upon the transverse shaft 90 for pivotal movement with respect thereto. Such pivotal movement is imparted to the elevator by mechanism including laterally spaced links 103, and of which is pivotally connected to each side of the elevator 82. These links extend forwardly and their forward ends are connected to an upwardly extending arm 104 affixed to the shaft 87. Arm 104 is connected by a rod 105 to the lifting arm 38, so that upon lifting the beet topper 16, the digger 27, and the agitator 52, the rod 105 is moved forwardly, rocking arm 104 in a clockwise direction and swinging elevator 82 forwardly about its pivot at 90. The lifting of the digger 27, of course, carries with it the front end of agitator 52, and since the digger mechanism moves upwardly and forwardly in an arc, the conveyor mechanism similarly moves forwardly. Therefore, due to the pivotal mounting of link 86 upon the shaft 87, link 86 swings forwardly carrying the lower end of the elevator forwardly therewith.

It should thus be clear that the elevator not only swings forwardly about its pivot 90 when the harvester parts are lifted, but also has imparted thereto a translational movement in a generally forward direction, since the pivot 89 also moves forwardly. This, is of course, important when transporting the harvester inasmuch as the weight of the elevator is more evenly distributed and better carried by the tractor if it is brought closer thereto.

Rearwardly of the elevator is positioned a wheel supported cart which includes a rectangular frame 106 supported at opposite ends by laterally spaced ground wheels 107, a receptacle 108 having vertically extending front and rear walls 109 and 110 and side walls 111 and 112. Side walls 109, 110 and 111 are provided with inwardly inclined lower portions terminating in spaced relation to provide an opening 113 in the bottom of the receptacle. The rear wall 112 of the receptacle is provided with an opening 114 to the opposite sides of which are secured rearward extensions 115. The extensions 115 extend rearwardly and upwardly and provide a guideway for an endless conveyor chain 116, the lower end of which forms a bottom for the receptacle and allows the passage of foreign matter therethrough.

Secured to the forward side of the frame 106 is a triangular draw frame 117 braced by a strap 118 secured to the draw frame and to the receptacle 108. At the forwardly extending apex of the triangular draw frame 27 there is provided a coupling 119 of conventional form for pivotal attachment to a draw-bar 120 connected to the tractor. Draw-bar 120 is secured to the tractor and braced by a strap 121.

A conventional power take-off shaft 122 is connected by a universal coupling 123 to a shaft 124 connected by a universal joint 125 to a shaft 126 mounted upon the frame 106, through which drive is transmitted by suitable sprocket and chain mechanism indicated at 127 to operate the conveyor chain 116.

Figure 2 of the drawings shows only the upper end of the rearwardly and upwardly extending elevating conveyor 82, the connection thereof to the tractor being eliminated for the sake of clarity. Figure 2 shows the position the elevator occupies with respect to the beet cart so that beets discharged from the elevator are deposited in the receptacle upon the chain conveyor 116. In actual practice the receptacle is filled with beets as it travels across a field and the conveyor chain 116 is not operated until the end of a row is reached. Operation of the conveyor 116 then functions to unload the beets from the beet cart and convey them to vehicles for transportation to their destination.

In passing through normally relatively dry soil conditions, the beets which have been discharged by the elevator 82 into the beet cart are relatively free from dirt adhering thereto. However, when passing through moist soil the dislodging of dirt clinging to the beets is more difficult and provision has been made to prevent the collection of large amounts of dirt with the beets in the cart prior to unloading.

Mounted upon a frame member 128 is an endless belt conveyor 129 suitably driven by mechanism indicated at 130 from one of the ground wheels 107. Frame 128 includes an extension 131 which extends approximately at right angles away from one end of the frame 128, as clearly shown in Figure 2. The lower end of the extension frame 131 is secured to a shaft 132, the ends of which are pivotally mounted in lugs 133 affixed to the rear wall 110 of the spectacle. Likewise secured to the shaft 132, as by welding, are rearwardly and downwardly curved arms 134, to the end of which is connected one end of a spring 135, the other end of which is anchored to a lug 136 affixed to the inwardly inclined lower portion of the wall 110.

The conveyor belt 129 is narrower in width than the opening in the receptacle. The belt spans this opening from front to rear thereof and the entire assembly is pivotable about the shaft 132 as an axis, so that the belt can be swung outwardly in the manner indicated in dotted lines in Figure 2. The forward end of frame 128 is releasably fastened to the receptacle by a latching mechanism shown in Figure 6 including a member 137 engageable by a spring biased latch 138 pivoted upon the receptacle. When the belt 129 spans the opening in the top of the receptacle, it is in position to receive beets discharged by gravity from the elevating conveyor 82. Since the forward end of the conveyor lies directly under the end of the elevator, the belt assembly has been caused to pivot about a point below its rear end so that the belt is swung in a long arc away from the elevator 82 when it is desired to move it to an inoperative position.

Beets discharged upon the belt 129 are carried therealong and sorted by operators standing upon platforms 139 and 140. The operators are thus in position to remove dirt clinging to the beets prior to dropping the beets into the receptacle. Dirt removed from the beets is carried along by the conveyor belt 129 and discharged from the rear end thereof. The dirt is thus returned to the soil in approximately the location from which it was withdrawn. When the beet car is again passing through comparatively dry soil so that sorting becomes unnecessary, the latch 138 holding the belt assembly in operating position is released and the sorting conveyor 129 is swung outwardly away from the receptacle to an inoperative position where the discharge of beets into the receptacle is not interfered with.

It is believed that the operation of the beet harvester of the present invention will be clear from the foregoing description. Sugar beets harvested by the method and apparatus described have had their tops cleanly and evenly removed and do not again touch the ground from the time they are dug until they are delivered to the processing plant or other destination. Moreover, the beets are singularly free from dirt and debris so that the grower receives a maximum return from his product. Having described the invention it may, of course, be understood that modifications may be made therein without departing from the spirit of the invention or the scope of the appended claims.

What is claimed is:

1. In a power operated harvesting machine for beets and the like including a wheeled supporting frame and topping mechanism for removing the foliage from the beet, digging mechanism for lifting the beets from the soil mounted upon the frame for movement with respect thereto, an elevator for the beets mounted on the frame rearwardly of the digger mechanism for movement with respect to the frame, a beet cleaning device between the digger mechanism and the elevator to receive the beets removed by the digger, remove surplus dirt and debris therefrom and deliver them to the elevator, a receptacle positioned rearwardly of the elevator and below the upper end thereof to receive by gravity the beets with the accompanying dirt and debris discharged by the elevator, and a generally horizontal traveling sorting conveyor in the path of material discharged by gravity from the elevator and extending to a location outside of the receptacle, whereby beets may be removed from the conveyor by hand and deposited in the receptacle while the dirt and debris is carried by the conveyor over the side of the receptacle and deposited on the ground, said sorting conveyor being swingable bodily to a position out of the path of material discharged from the elevator to permit discharge thereof directly into the receptacle.

2. In a power operated harvesting machine for beets and the like including a wheeled supporting frame and topping mechanism for removing the foliage from the beet, digging mechanism for lifting the beets from the soil mounted upon the frame for movement with respect thereto, an elevator for the beets mounted on the frame rearwardly of the digger mechanism for movement with respect to the frame, a beet cleaning device between the digger mechanism and the elevator to receive the beets removed by the digger, remove surplus dirt and debris therefrom and deliver them to the elevator, a wheeled vehicle connected to the machine rearwardly of the elevator, including a receptacle vertically below and in the path of material discharged by gravity from the elevator, and a sorting platform carried by the vehicle and swingable between positions in and out of the path of material discharged by gravity from the elevator.

3. In a power operated harvesting machine for beets and the like including a wheeled supporting frame and topping mechanism for removing the foliage from the beet, digging mechanism for lifting the beets from the soil mounted upon the frame for movement with respect thereto, an elevator for the beets mounted on the frame rearwardly of the digger mechanism for movement with respect to the frame, a beet cleaning device between the digger mechanism and the elevator to receive the beets removed by the digger, remove surplus dirt and debris therefrom and deliver them to the elevator, a wheeled vehicle connected to the machine rearwardly of the elevator, including a receptacle vertically below and in the path of material discharged from the elevator, a sorting platform carried by the vehicle and swingable between positions in and out of the path of material discharged from the elevator, whereby the beets may, if desired, be sorted from the dirt and debris and the beets deposited in the receptacle, an elevator associated with the vehicle for unloading beets therefrom, and means deriving power from the machine for driving the latter elevator.

4. In combination with a tractor having an elongated body, dirigible front wheels, laterally spaced rear wheels and a rear axle housing having at least one lateral extension, a harvesting mechanism for beets and the like comprising digging mechanism for lifting the beets from the soil and mounted at the side of the tractor for vertical movement with respect thereto in a plane at the side of and parallel to the tractor body between the body and the adjacent rear wheel, an elevator rearwardly of said axle housing in general alinement with the digging mechanism, means suspending the lower end of the elevator from said lateral extension for movement with respect thereto, and a combination cleaner and conveyor below said lateral extension between the digger and elevator to receive the beets from the digger, remove dirt and debris therefrom and deliver them to the elevator, said cleaner being pivotally connected at its forward end to the digger mechanism and at its rear end to the elevator for movement therewith, and power means connected to the digger and the elevator for effecting movement thereof.

5. In combination with a tractor having an elongated body, dirigible front wheels, laterally spaced rear wheels and a rear axle housing having at least one lateral extension, a harvesting mechanism for beets and the like comprising digging mechanism for lifting the beets from the soil and mounted at the side of the tractor for vertical movement with respect thereto in a plane at the side of and parallel to the tractor body between the body and the adjacent rear wheel, an elevator rearwardly of said axle housing in general alinement with the digging mechanism, means suspending the lower end of the elevator from said lateral extension for movement with respect thereto, and a combination cleaner and conveyor below said lateral extension between the digger and elevator to receive the beets from the digger, remove dirt and debris therefrom and deliver them to the elevator, said cleaner comprising laterally spaced frame members pivotally connected at one end to the digger mechanism and at the other end to the elevator for movement therewith, longitudinally spaced rollers having ends journaled in said frame members and radially projecting fingers, means deriving power from the tractor for driving said rollers, and a driving connection between the rollers and the elevator to drive the latter.

JOHN W. ORENDORFF.

References Cited in the file of this patent

UNITED STATES PATENTS

| Number | Name | Date |
|---|---|---|
| 1,164,163 | Blair | Dec. 14, 1915 |
| 1,343,586 | Sang | June 15, 1920 |
| 1,480,354 | Wardell | Jan. 8, 1924 |
| 1,487,273 | Sang | Mar. 18, 1924 |
| 1,651,642 | Stanfield | Dec. 6, 1927 |
| 1,663,257 | MacKenzie | Mar. 20, 1928 |
| 2,191,322 | Matthews | Feb. 20, 1940 |
| 2,338,337 | Kerr | Jan. 4, 1944 |
| 2,379,198 | Templeton | June 26, 1945 |
| 2,447,399 | Dey | Aug. 17, 1948 |
| 2,453,714 | Lapointe | Nov. 16, 1948 |

FOREIGN PATENTS

| Number | Country | Date |
|---|---|---|
| 449,645 | Germany | Sept. 21, 1927 |
| 645,276 | France | June 26, 1928 |
| 847,739 | France | July 10, 1939 |